(No Model.)
J. R. FINLEY.
DRAWING KNIFE.
No. 406,392. Patented July 2, 1889.
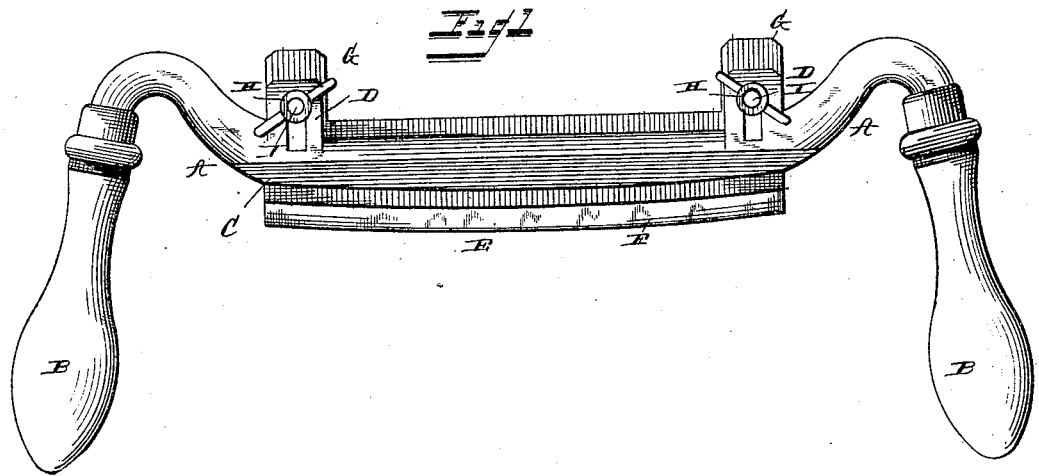
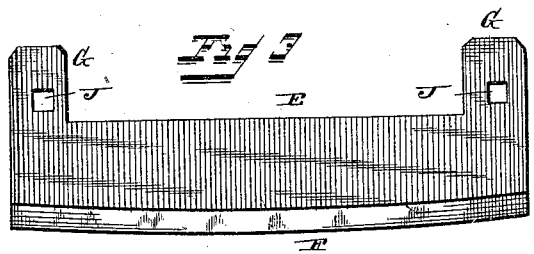
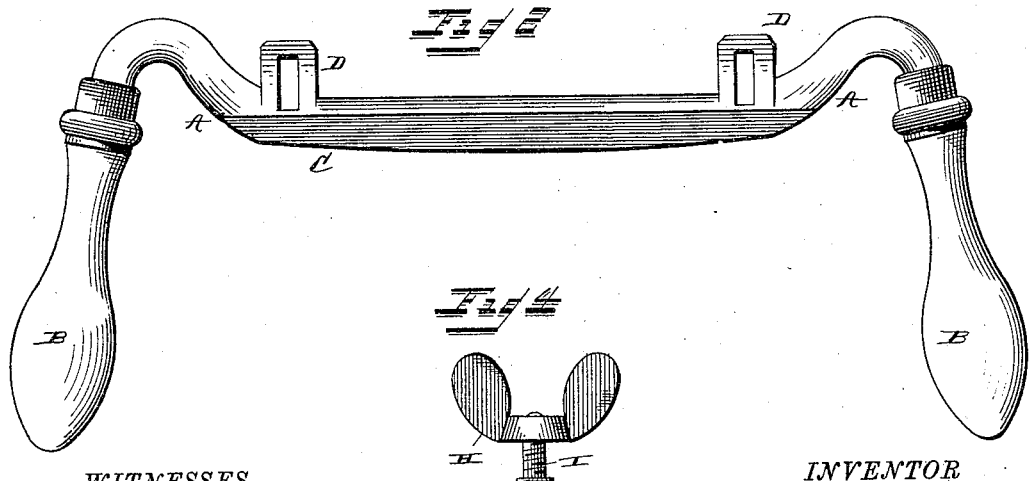
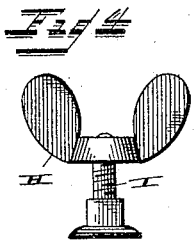
WITNESSES
F. L. Durand
Benj. E. Cowl
INVENTOR
James R. Finley
By Louis Baggert & Co.
Attorneys

UNITED STATES PATENT OFFICE.

JAMES R. FINLEY, OF DELPHI, INDIANA, ASSIGNOR OF ONE-HALF TO WILLIS J. GINN AND MICHAEL McGLENNEN, BOTH OF SAME PLACE.

DRAWING-KNIFE.

SPECIFICATION forming part of Letters Patent No. 406,392, dated July 2, 1889.

Application filed August 18, 1888. Serial No. 283,064. (No model.)

*To all whom it may concern:*

Be it known that I, JAMES R. FINLEY, a citizen of the United States, and a resident of Delphi, in the county of Carroll and State of Indiana, have invented certain new and useful Improvements in Drawing-Knives; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view of my improved drawing-knife. Fig. 2 is a similar view of the frame of the knife. Fig. 3 is a detail view of the adjustable knife or cutter, and Fig. 4 is a detail view of one of the binding screws and nuts for adjusting the movable knife-blade and holding the same upon the frame in its adjusted position.

Like letters of reference indicate corresponding parts in all the figures.

My invention has relation to drawing-knives used by carpenters, coopers, and many other trades; and it consists in the combination, with a frame provided at opposite ends with the usual handles, of an adjustable and removable knife or cutter blade, substantially as will be hereinafter more fully described, and particularly pointed out in the claim.

Reference being had to the accompanying drawings, the letter A designates the frame, which is of the usual shape and provided at opposite ends with handles B B. The middle part of the frame is of the shape shown more clearly in Fig. 2, and is provided with a beveled and slightly-convex front edge C and with two rearwardly-projecting parallel slotted ears D D. The blade (shown at E) may be of any suitable width, and corresponds in length to the distance between the outer edges of the ears D D. It has a slightly-convex cutting-edge F, and is provided with two projections G G on its back part, approximating in size and shape the slotted ears D of the frame and registering with the same. When the device is to be used, this blade is secured upon the frame in the manner clearly shown in Fig. 1—viz., by thumb-nuts H, which work upon screws I, that are inserted through apertures J in the projections G G of the knife-blade. In order to prevent these nuts from turning, the apertures J J are made square, and the shank of the nut I, which projects through said apertures, is of a corresponding square shape, whereby I prevent turning of the screw while the nut is being turned for the purpose of adjusting or removing the blade upon the frame.

From the foregoing description, taken in connection with the drawings, it will be seen that the blade may be adjusted forward and back simply by loosening the two nuts H and sliding it in the direction required. The slotted ears D D, operating in conjunction with the screws I, will cause the blade to move true forward and back, while at the same time this device forms a means of attachment of the blade upon the frame. When it is desired to sharpen the blade, it is only necessary to remove the thumb-nuts, after which the blade can be readily detached from the frame.

By this construction it will be seen that blades of different shapes and degrees of fineness may be used upon the same frame, and also that the blade may be sharpened repeatedly without reducing the strength of the frame, as in drawing-knives of the ordinary construction, in which the knife and frame are formed in one piece.

Having thus described my invention, I claim and desire to secure by Letters Patent of the United States—

The combination of the frame having parallel slotted rearward projections, an adjustable and removable blade provided with similar projections having square apertures, bolts having square shanks adapted to fit in the said apertures, and thumb-nuts for engaging the said bolts, substantially as described.

In testimony that I claim the foregoing as my own I have hereunto affixed my signature in presence of two witnesses.

JAMES R. FINLEY.

Witnesses:
ADELBERT B. CRAMPTON,
JOHN W. FAWCETT.